US 10,677,453 B2

(12) United States Patent
Reiter et al.

(10) Patent No.: US 10,677,453 B2
(45) Date of Patent: Jun. 9, 2020

(54) SEQUENTIAL COMBUSTION ARRANGEMENT WITH COOLING GAS FOR DILUTION

(71) Applicant: ANSALDO ENERGIA SWITZERLAND AG, Baden (CH)

(72) Inventors: Wilhelm Reiter, Küssaberg (DE); Jürgen Gerhard Hoffmann, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 399 days.

(21) Appl. No.: 15/234,605

(22) Filed: Aug. 11, 2016

(65) Prior Publication Data
US 2017/0045228 A1 Feb. 16, 2017

(30) Foreign Application Priority Data
Aug. 12, 2015 (EP) .................................... 15180787

(51) Int. Cl.
*F23C 6/04* (2006.01)
*F23R 3/34* (2006.01)
(Continued)

(52) U.S. Cl.
CPC .............. *F23C 6/047* (2013.01); *F01D 5/187* (2013.01); *F01D 9/041* (2013.01); *F01D 25/12* (2013.01);
(Continued)

(58) Field of Classification Search
CPC ............ F23R 2900/03341; F23R 3/346; F23R 2900/03043; F02C 7/12; F02C 7/18;
(Continued)

(56) References Cited

U.S. PATENT DOCUMENTS 4,932,861 A 6/1990 Keller et al.
5,735,687 A 4/1998 Knopfel et al.
(Continued)

FOREIGN PATENT DOCUMENTS

CN 104541104 A 4/2015
DE 19 547 913 A1 8/1997
(Continued)

OTHER PUBLICATIONS

A. C. Carmack, Heat Transfer and Flow Measurments in Gas Turbine Engine Can and Annular Combustors, Viginia Polytechnic Institute and State University, Apr. 2012.*
(Continued)

*Primary Examiner* — William H Rodriguez
*Assistant Examiner* — Rodolphe Andre Chabreyrie
(74) *Attorney, Agent, or Firm* — Buchanan Ingersoll & Rooney PC

(57) ABSTRACT

A gas turbine with a sequential combustor arrangement as disclosed includes a first combustor with a first burner for admitting a first fuel into a combustor inlet gas during operation and a first combustion chamber for burning the first fuel, a dilution gas admixer for admixing a dilution gas to the first combustor combustion products leaving the first combustion chamber, a second burner for admixing a second fuel and a second combustion chamber. To assure a temperature profile after the dilution gas admixer and to increase the gas turbine's power and efficiency a vane and/or blade of the turbine has a closed loop cooling. The outlet of the closed loop cooling is connected to the dilution gas admixer for admixing the heated cooling gas leaving the vane and/or blade into the first combustor combustion products.

20 Claims, 2 Drawing Sheets

(51) Int. Cl.
  *F01D 5/18* (2006.01)
  *F01D 9/04* (2006.01)
  *F01D 25/12* (2006.01)
  *F23R 3/02* (2006.01)
  *F23R 3/36* (2006.01)

(52) U.S. Cl.
  CPC .................. *F23R 3/02* (2013.01); *F23R 3/34* (2013.01); *F23R 3/36* (2013.01); *F05D 2260/201* (2013.01); *F23R 2900/03041* (2013.01); *F23R 2900/03341* (2013.01)

(58) Field of Classification Search
  CPC .... F02C 6/08; F23C 6/04; F23C 6/047; F01D 5/187
  See application file for complete search history.

(56) References Cited

U.S. PATENT DOCUMENTS

| | | | | |
|---|---|---|---|---|
| 6,227,804 | B1* | 5/2001 | Koga | F01D 5/187 |
| | | | | 415/115 |
| 6,523,346 | B1* | 2/2003 | Hoffmann | F01K 23/10 |
| | | | | 60/646 |
| 6,935,116 | B2 | 8/2005 | Stuttaford et al. | |
| 7,237,384 | B2 | 7/2007 | Stuttaford et al. | |
| 9,890,955 | B2* | 2/2018 | Freitag | F02C 7/22 |
| 2012/0060507 | A1* | 3/2012 | King | F01D 5/081 |
| | | | | 60/782 |
| 2012/0260665 | A1* | 10/2012 | Eroglu | F23R 3/286 |
| | | | | 60/774 |
| 2015/0101341 | A1* | 4/2015 | Dusing | F02C 3/14 |
| | | | | 60/774 |

FOREIGN PATENT DOCUMENTS

| | | |
|---|---|---|
| DE | 103 12 971 A1 | 12/2004 |
| EP | 0 321 809 A1 | 6/1989 |
| EP | 2 722 591 A1 | 4/2014 |

OTHER PUBLICATIONS

Web page <http://www.Lenntech.com/ventury>, 3 pages, Oct. 20, 2006, retrieved from Internet Archive Wayback Machine <http://www.Lenntech.com/ventury > on Jul. 18, 2019<https://web.archive.org/web/20061020223144/https://www.lenntech.com/venturi.htm >).*
European Search Report dated Feb. 5, 2016, by the European Patent Office for Application No. 15180787.2.
Chinese Office Action for Chinese Patent Application No. 201610659807.5 dated Aug. 5, 2019.
Chinese Office Action for Chinese Patent Application No. 201610659807.5 dated Aug. 5, 2019 (English Translation).

\* cited by examiner

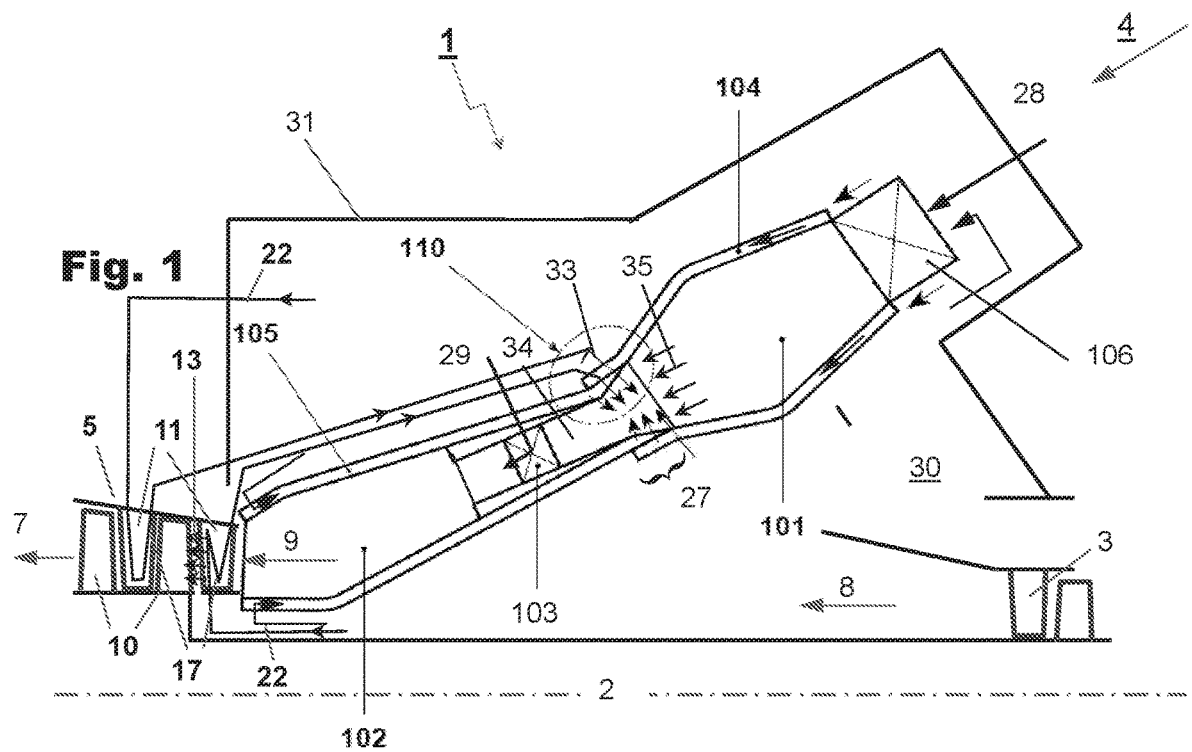
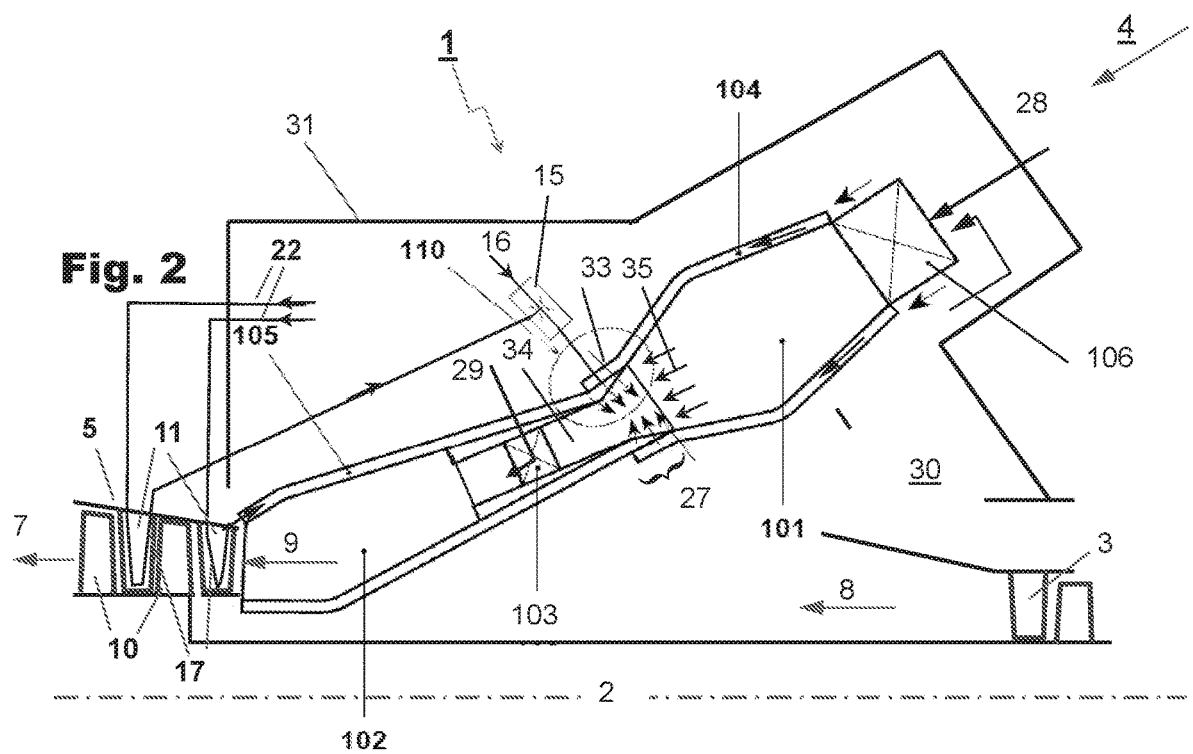

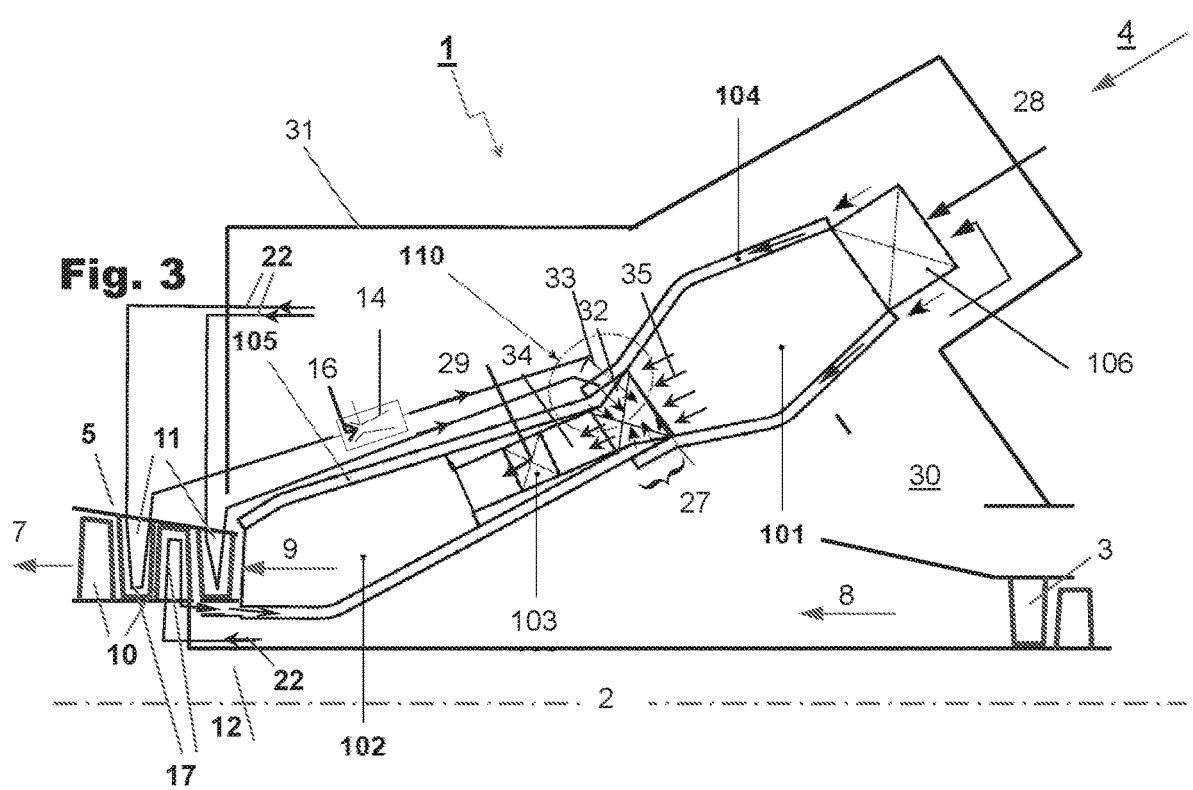

SEQUENTIAL COMBUSTION ARRANGEMENT WITH COOLING GAS FOR DILUTION

TECHNICAL FIELD

The invention refers to a sequential combustor arrangement for a gas turbine with admixing returned turbine cooling gas as dilution gas into the sequential combustor arrangement. The invention additionally refers to a method for operating a gas turbine with admixing returned turbine cooling gas as dilution gas into a sequential combustor arrangement.

BACKGROUND OF THE DISCLOSURE

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and to increase operational flexibility sequential combustion has been suggested in DE 10312971 A1. Depending on the operating conditions, in particular on the hot gas temperature of a first combustion chamber, it can be necessary to cool the hot gases before they are admitted to a second burner (also called sequential burner). This cooling can be advantageous to allow fuel injection and premixing of the injected fuel with the hot flue gases of the first combustor in the second burner.

A homogeneous inlet temperature to the second combustion chamber and good mixing of fuel injected in the second burner with the gases leaving the first combustor is a prerequisite for stable combustion with low emission values. To facilitate the generation of a homogeneous temperature profile the temperature difference between admixed gas and the hot combustion gases should be minimized while it has to remain colder that the intended inlet temperature for the second combustor.

At the same time power and efficiency should be improved.

SUMMARY OF THE DISCLOSURE

The object of the present disclosure is to propose a gas turbine with a sequential combustor arrangement comprising means for admixing dilution gas and the second fuel between the first combustion chamber and the second combustion chamber. Such a "dilution burner" has to provide the proper inlet flow conditions for the second combustor for a wide operating range of the gas turbine without impairing power and efficiency of the gas turbine. Basically, predefined inlet conditions have to be assured for all operating conditions in which the second combustor is operating. In particular the hot gases are cooled to predetermined hot gas temperatures. Further, velocity distribution, oxygen and fuel content can be conditioned (e.g. controlled to a prescribed profile) for the second combustion chamber with proper admixing of dilution gas. The second combustor typically comprises a second burner and a second combustion chamber.

The second burner can be integrated or combined with the dilution gas admixer.

Deviations from prescribed inlet temperatures may result in high emissions (e.g. NOx, CO, and unburned hydrocarbons) and/or flashback in the dilution burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increased NOx emission. Low temperature regions can cause CO emissions, due to the increased self-ignition time. This can reduce the time for CO to CO2 burnout, and a reduced local flame temperature, which can further slowdown the CO to CO2 burnout. Finally local hot spots may lead to overheating in certain regions downstream of the mixer.

Dilution gas can for example be compressed air or a mixture of air and flue gases of a gas turbine. Also compressed flue gases can be used as dilution gas.

According to a first embodiment of a gas turbine with a sequential combustor arrangement the sequential combustor arrangement comprising a first combustor with a first burner for admitting a first fuel into a combustor inlet gas during operation, and a first combustion chamber for burning the first fuel with the combustor inlet gas. Typically the combustor inlet gas is compressed air. Depending on the application it can be another gas or gas mixture such as for example a mixture of air and a flue gas. The sequential combustor arrangement further comprises a dilution gas admixer for admixing a dilution gas to the first combustor combustion products leaving the first combustion chamber, and a second burner for admixing a second fuel and a second combustion chamber. The second fuel can be burned with the mixture of first combustion products and dilution air in the second combustion chamber. The first combustor, the dilution gas admixer, the second burner and second combustion chamber are arranged sequentially in a fluid flow connection.

In order to provide the admixer with compressed gas at optimum temperature a vane and/or blade of the turbine has a closed loop cooling is proposed. It can be connected to a compressor plenum for feeding compressed cooling fluid into the vane and/or blade. The outlet of the closed loop cooling is connected to the dilution gas admixer for admixing the heated cooling gas leaving the vane and/or blade into the first combustor combustion products during operation of the gas turbine. The cooling gas is heated for example to a temperature above the compressor exit temperature thus reducing the temperature difference between hot gases and dilution gas thereby facilitating the generation of a homogeneous temperature profile. As a result reduced NOx emission values can be achieved for the same hot gas temperature due to better temperature profiles.

In addition the gas turbine efficiency can be increase because of the closed loop cooling. In particular the mixed turbine inlet temperature can be increased for the same hot gas temperature by application of a closed loop cooling thereby increasing power end efficiency of the gas turbine and a combined cycle power plant with such a gas turbine.

Here a closed loop cooling system is a way of cooling in which cooling gas is fed into the vane or blade at one end of the closed loop cooling, used for internal cooling of the blade, and flows to an outlet of the closed loop cooling. In contrast, in an open loop cooling system gas is fed into a vane or blade and then discharged from the blade or vane into the hot gas flowing around the vane or blade the cooling gas leaving the closed loop cooling at the outlet can be further used e.g. for cooling or admixing.

The first combustor has a pressure drop which can for example be in the order of 3% to 7%, or in another example in the range of 4% to 5% of the total pressure in the compressor plenum. This pressure drop can be used to feed gas from the compressor plenum through the closed loop cooling, supply it to the dilution gas admixer and to inject the heated cooling gas into the to the first combustor combustion products leaving the first combustion chamber. The heated cooling gas therefor can still be used in the second combustor upstream of the flame of the second combustor.

Thus the proposed arrangement enables the use of a closed loop cooling which is fed from the compressor plenum for additional cooling purposes and dilution gas admixing without any recompression. Recompression is required in conventional gas turbines with only one combustion chamber to re-inject or admix cooling gas into the combustor arrangement upstream of aflame.

Thus the invention presents a way to use the first combustor's pressure drop for cooling purposes. Thereby cooling air for the turbine can be saved and at the same time heat from the turbine cooling can be recuperated to the second combustor.

According to one embodiment the gas turbine comprises a cooling gas feed which connects the compressor plenum with the closed loop cooling for feeding compressed gas leaving the compressor into the closed loop cooling.

According to a further embodiment the cooling gas feed is arranged between the rotor and the sequential combustor arrangement.

According to yet a further embodiment the cooling gas feed is arranged between the combustor casing and the sequential combustor arrangement.

According to another embodiment of the gas turbine at least one of a cooling channel for cooling a first combustion liner of the first combustion chamber, a second combustor liner, a wall of the second burner, mixing section, and dilution gas admixer is interposed between the outlet of the closed loop cooling and the dilution gas admixer. Thus the cooling gas leaving the closed cooling circuit is further used to cool at least one additional component of the combustor arrangement before it is fed into the dilution gas admixer.

For an embodiment in which the cooling gas is fed to the second combustor liner the cooling gas leaving the first vane's closed loop cooling can be directly fed into the cooling channel for cooling the second combustor liner and flows in counter flow with the hot gases inside the second combustor towards the dilution gas admixer.

For other arrangements pipes can be used to feed the cooling gas from the closed loop cooling to the respective component of the combustor arrangement.

The dilution gas mass flow required for dilution gas admixing can exceed the mass flow of cooling gas leaving the closed loop cooling. To increase the dilution gas mass flow the closed loop cooling air can be mixed with compressor exit air before injection into the mixer.

In a further embodiment of the gas turbine an ejector pump is interposed in a line between the outlet of the closed loop cooling and the dilution gas admixer.

The driving gas for the ejector pump can be compressed gas from the compressor plenum. An ejector pump can for example be useful for part load operation when the hot gas temperature of the second combustor is reduced. Due to the reduced hot gas temperature the volume flow is reduced and the pressure drop of the second combustor decreases correspondingly. Due to the reduced pressure drop over the second combustor the driving pressure difference for the closed loop cooling can be reduced leading to a reduction in cooling air flow. Such a reduction in cooling air flow can be mitigated by an injector pump. However, for such low load operation the cooling requirement is also reduced due to the reduced hot gas temperature so that the system typically can work without an ejector pump or any other kind of booster.

In one embodiment at least one feed to the dilution gas admixer is directly connected to the compressor plenum for additionally admixing compressor exit gas into the first combustor combustion products. Thereby the admixed dilution gas mass flow can be increased which else might be limited to the cooling gas flow of the closed loop cooling.

In a further embodiment the additional compressor exit gas is first admixed in to the first combustor combustion products leaving the first combustion chamber and the heated cooling gas is admixed downstream in flow direction of the combustion products. Such an arrangement can be advantageous to create a homogeneous temperature profile because the temperature differences at the second injection location are smaller.

Besides the gas turbine a method for operation such a gas turbine is an object of this disclosure.

A method for operating such a gas turbine comprises the following steps:
compressing the inlet gas in the compressor,
admixing a first fuel to at least a portion of the compressed gas in the first burner,
burning the mixture in the first combustion chamber to obtain first combustor combustion products.

After these conventional steps the first combustion products are admitted to the dilution gas admixer. To cool the first combustor combustion products a dilution gas flow is admitted into the first combustor combustion products flowing through the admixer.

According to a first embodiment of the method a vane and/or blade of the turbine is cooled with a compressed gas flowing through a closed loop cooling of the vane and/or the blade. The heated cooling gas leaving the vane and/or blade is fed into the dilution gas admixer as dilution gas and is admixed to the first combustor combustion products.

According to a further embodiment of the method compressed gas from the compressor plenum is fed into the closed loop cooling.

According to a further embodiment of the method the compressed gas is fed to the closed loop cooling from a cooling gas feed arranged in the compressor plenum between the rotor and the sequential combustor arrangement.

According to yet another embodiment of the method the compressed gas is fed to the closed loop cooling from a cooling gas feed arranged in the compressor plenum between the combustor casing and the sequential combustor arrangement.

In a further embodiment of the method the cooling gas leaving the closed loop cooling flows through a cooling channel for cooling at least one of a first combustion liner, second combustor liner, a wall of the second burner, mixing section, and dilution gas admixer before it is fed into the dilution gas admixer.

In yet a further embodiment of the method for operating the gas turbine the pressure of the cooling gas leaving the closed loop cooling is increased in an ejector pump before the cooling gas is fed into the dilution gas admixer. Such an ejector pump can for example be a venturi nozzle.

In a more specific embodiment of the method the compressed gas from the compressor plenum is used to drive the ejector pump and to pressurize the cooling gas in the ejector pump.

In another embodiment of the method compressed gas taken directly from the compressor plenum is admixed into the first combustor combustion products in the dilution gas admixer.

The dilution gas admixer can also be combined with dampers or as connecters to damping volumes as described in the European patent application EP12189685, which is incooperated by reference.

The gas turbine can include a flue gas recirculation system, in which a part of the flue gas leaving the turbine is admixed to the compressor inlet gas of the gas turbine.

Different cooling technologies might be used for cooling the combustor liners and admixer wall. For example effusion cooling, impingement cooling or convective cooling or a combination of cooling methods can be used.

Referring to a sequential combustion the combination of combustors can be disposed as follows:

Both, the first and second combustors are configured as sequential can-can architecture.
The first combustor is configured as an annular combustion chamber and the second combustor is configured as a can configuration.
The first combustor is configured as a can-architecture and the second combustor is configured as an annular combustion chamber.
Both, the first and second combustor are configured as annular combustion chambers.

Different burner types can be used. For the first combustor so called EV burner as known for example from the EP 0 321 809 or AEV burners as known for example from the DE195 47 913 can for example be used. Also a BEV burner comprising a swirl chamber as described in the European Patent application EP12189388.7, which is incorporated by reference, can be used. In a can architecture a single or a multiple burner arrangement per can combustor can be used. Further, a flamesheet combustor as described in U.S. Pat. No. 6,935,116 B2 or U.S. Pat. No. 7,237,384 B2, which are incorporated by reference, can be used as first combustor.

BRIEF DESCRIPTION OF THE DRAWINGS

The disclosure, its nature as well as its advantages, shall be described in more detail below with the aid of the accompanying schematic drawings.

Referring to the drawings:

FIG. 1 shows a gas turbine with a sequential combustion arrangement with a first burner, first combustion chamber, an admixer for admixing dilution gas, a second burner, a second combustion chamber and closed loop cooled vanes;

FIG. 2 shows a gas turbine with a sequential combustion arrangement with a first burner, first combustion chamber, an admixer for admixing dilution gas, a second burner, a second combustion chamber and closed loop cooled vanes and a venturi nozzle to boost the pressure level of cooling gas leaving the closed loop cooling;

FIG. 3 shows a gas turbine with a sequential combustion arrangement with a first burner, first combustion chamber, an admixer for admixing dilution gas, a second burner, a second combustion chamber and closed loop cooled vanes, and blades as well an ejector pump to boost the pressure level of cooling gas leaving the closed loop cooling.

EMBODIMENTS OF THE DISCLOSURE

FIG. 1 shows a gas turbine 1 with a sequential combustor arrangement 4. It comprises a compressor 3, a sequential combustor arrangement 4, and a turbine 5.

The sequential combustor arrangement 4 comprises a first burner 106, a first combustion chamber 101, and a dilution gas admixer 27 for admixing a dilution gas 33 to the hot gases leaving the first combustion chamber 101 during operation. Downstream of the admixer 27 the sequential combustor arrangement 4 further comprises a second burner 103, and a second combustion chamber 102. The first burner 106, first combustion chamber 101, admixer 27, second burner 103 and second combustion chamber 102 are arranged sequentially in a fluid flow connection. The sequential combustor arrangement 4 is housed in a combustor casing 31. The compressed gas 8 leaving the compressor 3 passes through a diffusor for at least partly recovering the dynamic pressure of the gas leaving the compressor 3.

The turbine 5 comprises vanes 11, and blades 10. The vanes 11 are cooled with cooling gas flowing through a closed loop cooling 17. Cooling gas is fed to the closed loop cooling 17 from the compressor plenum 30 through cooling gas feeds 22. A cooling gas feed 22 can for example be arranged in the compressor plenum 30 in a region between the rotor 2 and the combustor arrangement 4, or in a region between the combustor arrangement 4 and the combustor casing 31.

Open loop cooling gas 13 can be discharged from the vane 11 into the hot gas flow.

During operation cooling gas which was heated in the closed loop cooling 17 is injected as dilution gas by the dilution gas admixer 27 into the first combustor combustion products 35. In this example dilution gas injection 110 is used for the dilution gas admixing.

The sequential combustor arrangement 4 further comprises a first combustor liner 104 for guiding cooling gas along the walls of the first combustion chamber, and a second combustor liner 105 for guiding cooling gas along the walls of the second combustion chamber 102.

A first fuel 28 can be introduced into the first burner 106 via a first fuel injection, mixed with compressed gas 8 which is compressed in the compressor 3, and burned in the first combustion chamber 101. Dilution gas 33 is admixed in the subsequent admixer 27. A second fuel 29 can be introduced into the second burner 103 via a second fuel injector, mixed with hot gas leaving the admixer 27 and burned in the second combustion chamber 102. The hot gas leaving the second combustion chamber 102 is expanded in the subsequent turbine 5, performing work. The turbine 5 and compressor 3 are arranged on a rotor 2.

The remaining heat of the exhaust gas 7 leaving the turbine 5 can be further used in a heat recovery steam generator or boiler (not shown) for steam generation.

In the example shown here compressed gas 8 is admixed as dilution gas 33. Typically compressed gas 8 is compressed ambient air. For gas turbines with flue gas recirculation (not shown) the compressor gas is a mixture of ambient air and recirculated flue gas.

Typically, the gas turbine system includes a generator (not shown) which is coupled to a rotor 2 of the gas turbine 1. The gas turbine 1 further comprises a cooling system for the turbine 5, which is also not shown as it is not subject of the invention.

The embodiment of FIG. 2 differs from the gas turbine of FIG. 1 in that the pressure of cooling gas returning from the closed loop cooling 17 of the second vane is boosted in a venturi nozzle 15 using compressed gas 8 from the compressor plenum as driving fluid 16 before it is fed into the admixer 27. Further, the cooling gas turbine from the first vane is used as cooling fluid to cool the walls of the second combustor liner 105 before it is fed into the admixer 27.

The example of FIG. 2 further shows an additional dilution gas injection 33 upstream (with respect to the hot gases flowing through the combustor arrangement 4) of the location at which the heated cooling gas is injected in the admixer 27.

The embodiment of FIG. 3 is also based on FIG. 1. It differs from the gas turbine of FIG. 1 in that the admixer 27 comprises a streamlined body 32 for injecting dilution gas 33 into the first combustor combustion products. At least part of the dilution gas 33 is first introduced into the streamlined body 32 and injected into first combustor combustion products 35 from the streamlined body 32. In the example shown the streamlined body 32 is arranged right at the entrance into the admixer 27. Embodiments in which the streamlined body 32 is arranged further downstream in the admixer 27 are also conceivable.

The embodiment of FIG. 3 further comprises a closed loop cooling 17 for the first blade 10. Compressed gas 8 is fed via the blade cooling gas feed 12 to the closed loop cooling 17. The heated cooling gas returning from the first blade 10 is fed into the cooling channel of second combustor liner 105, flows along the second combustor liner 105 until it reaches the admixer 27 and is injected into the first combustor combustion products 35.

The example further shows an injector pump 14 which is used to boost the pressure of the cooling gas returning from the closed loop cooling 17 of the second vane before it is injected via the admixer 27.

For all shown arrangements can or annular architectures or any combination of the two is possible. Flame Sheet, EV, AEV or BEV burners can be used for can as well as for annular architectures.

The mixing quality of the admixer II is crucial for a stable clean combustion since the burner system of the second combustion chamber 102 requires a prescribed inlet conditions.

All the explained advantages are not limited to the specified combinations but can also be used in other combinations or alone without departing from the scope of the disclosure. Other possibilities are optionally conceivable, for example, for deactivating individual burners or groups of burners at part load operation. Further, the cooling gas and the dilution gas can be re-cooled in a cooling gas cooler before use as cooling gas, respectively as dilution gas.

LIST OF DESIGNATIONS

1 Gas Turbine
2 Rotor
3 Compressor
4 Sequential combustor arrangement
5 Turbine
7 Exhaust Gas
8 Compressed gas
9 Combustion Products
10 Blade
11 Vane
12 Blade cooling gas feed
13 Open loop cooling gas
14 Ejector pump
15 Venturi nozzle
16 Driving fluid
17 Closed loop cooling
22 Vane cooling gasfeed
27 Dilution gas admixer
28 First fuel injection
29 Second fuel injection
30 Compressor plenum
31 Combustor casing
32 Streamlined body
33 Dilution gas
34 Mixing section
35 First combustion products
36 Dilution gas control valve
101 First combustion chamber
102 Second combustion chamber
103 Second burner
104 First combustor liner
105 Second cornbustor liner
106 First burner
110 Dilution gas injection

The invention claimed is:

1. A gas turbine comprising:
a compressor,
a turbine, and
a sequential combustor arrangement comprising:
a first combustor with a first burner for admitting a first fuel into a first combustion chamber for burning the first fuel to form first combustor combustion products;
a dilution gas admixer for admixing a dilution gas to the first combustor combustion products leaving the first combustion chamber;
a second burner for admixing a second fuel in a second combustion chamber, wherein the first combustor, the dilution gas admixer, the second burner and the second combustion chamber are arranged sequentially and are in a fluid flow connection;
a vane and/or blade of the turbine having a cooling loop which is connected to a compressor plenum for feeding compressed cooling fluid into the vane and/or blade to cool the vane and/or blade, the cooling loop of the vane and/or blade configured to internally cool the vane and/or blade without being discharged from the vane and/or blade into hot gas flowing around an exterior of the vane and/or blade, the cooling loop having an outlet connected to the dilution gas admixer, the outlet of the cooling loop being positioned and configured to pass the compressed cooling fluid that has flowed within the vane and/or blade of the turbine to the dilution gas admixer so that the compressed cooling fluid that is heated via flowing within the vane and/or blade to cool the vane and/or blade passes to the dilution gas admixer to he injected into the first combustion products as the dilution gas so that the compressed cooling fluid that was heated from passing within the vane and/or blade to cool the vane and/or blade is subsequently admixed with the first combustor combustion products via the dilution gas admixer to facilitate generation of a homogenous temperature profile for the admixed first combustion products and dilution gas to be fed to the second burner to reduce NOx emission values;

the dilution gas admixer positioned upstream of the second burner, with respect to a flow direction of the first combustor combustion products, and configured to receive the compressed cooling fluid from the outlet of the cooling loop and inject the dilution gas into the first combustor combustion products such that the compressed cooling fluid that was heated from passing within the vane and/or blade to cool the vane and or blade is admixed with the first combustor combustion products via, the dilution gas admixer to generate the homogenous temperature profile for the admixed first combustor combustion products and dilution gas to reduce NOx emission values for feeding the admixed first combustion products and dilution gas to the second burner; and an additional cooling loop to cool an additional vane and/or blade positioned upstream of the vane and/or blade, with respect to the flow direction of the first combustor combustion products, the additional cooling loop being connected to the compressor plenum to receive the compressed cooling fluid, being open to discharge from the additional vane and/or blade, and being connected to the gas admixer to provide additional compressed heated fluid to the first combustion products.

2. The gas turbine as claimed in claim 1, wherein the cooling loop has a cooling gas feed connecting the compressor plenum to the cooling loop.

3. The gas turbine as claimed in claim 2, wherein the cooling gas feed is arranged between a rotor and the sequential combustor arrangement.

4. The gas turbine as claimed in claim 2, wherein the cooling gas feed is arranged between a combustor casing and the sequential combustor arrangement.

5. The gas turbine as claimed in claim 1, comprising: a cooling channel for cooling at least one of a first combustion liner of the first combustor, a second combustor liner of the second combustor, a wall of the second burner, a mixing section, and the dilution gas admixer.

6. The gas turbine as claimed in claim 1, comprising: an ejector pump interposed between the outlet of the cooling loop and the dilution gas admixer.

7. The gas turbine as claimed in claim 1, comprising: at least one feed to the dilution gas admixer directly connected to the compressor plenum for additionally admixing compressor exit gas into the first combustor combustion products.

8. A method for operating a gas turbine having a compressor, a turbine and a sequential combustor arrangement with a first combustor having a first burner and a first combustion chamber, a dilution gas admixer, a second burner and a second combustion chamber, wherein the first combustor, the dilution gas admixer, the second burner, and second combustion chamber are arranged sequentially in a fluid now connection, the method comprising: compressing inlet gas in the compressor;

burning a mixture in the first combustion chamber to obtain first combustor combustion products;

passing compressed gas through a cooling loop of a vane and/or blade of the turbine so that the compressed gas is passed within the vane and/or blade to internally cool the vane and/or blade without the compressed gas passing through the vane and/or blade being discharged into hot gas flowing around an exterior of the vane and/or blade;

feeding the compressed gas from the cooling loop of the vane and/or blade to the dilution gas admixer without recompression of the compressed gas after the compressed gas is passed through the cooling loop of the vane and/or blade to internally cool the vane and/or blade;

generating a homogenous temperature profile of the first combustor combustion products and dilution gas to reduce NOx emission values by admixing dilution gas to the first combustor combustion products leaving the first combustion chamber in the dilution gas admixer for feeding the dilution gas admixed with the first combustor combustion products to the second burner to generate the homogenous temperature profile for the first combustor combustion products and dilution gas to reduce the NOx emission values, the dilution gas including the compressed gas fed to the dilution gas admixer from the cooling loop of the vane and/or blade to facilitate generation of the homogenous temperature profile for the admixed first combustor combustion products and dilution gas to reduce the NOx emission values;

feeding the admixed dilution gas and the first combustor products having the homogenous temperature profile to the second burner;

passing additional compressed gas through an additional cooling loop to cool an additional vane and/or blade positioned upstream of the vane and/or blade, with respect to a flow direction of the first combustor combustion products, the additional cooling loop being open to discharge from the additional vane and/or blade; and feeding the additional compressed gas from the additional cooling loop to the gas admixer to provide additional compressed heated fluid to the first combustor combustion products.

9. The method for operating a gas turbine according to claim 8, comprising:

feeding the compressed gas from a compressor plenum into the cooling loop of the vane and/or blade.

10. The method for operating a gas turbine according to claim 8, comprising:

feeding the compressed gas from a cooling gas feed to the cooling loop of the vane and/or blade, the cooling gas feed being arranged between a rotor and the sequential combustor arrangement.

11. The method for operating a gas turbine according to claim 8, comprising: feeding the compressed gas to the cooling loop from a cooling gas feed arranged between a combustor casing and the sequential combustor arrangement.

12. The method for operating a gas turbine as claimed in claim 8, the wherein the feeding of the compressed gas from the cooling loop of the vane and/or blade to the dilution gas admixer after the compressed gas is passed through the cooling loop of the vane and/or blade to internally cool the vane and/or blade comprises:

passing the compressed gas from the cooling loop of the vane and/or blade through a cooling channel for cooling at least one of a first combustion liner, a second combustor liner, a wall of the second burner, and a mixing section before it is fed into the dilution gas admixer.

13. The method for operating a gas turbine as claimed in claim 8, comprising:
increasing a pressure of the compressed gas leaving the cooling loop in an ejector pump before the compressed gas is fed into the dilution gas admixer.

14. The method for operating a gas turbine as claimed in claim 13, comprising: using compressed gas from a compressor plenum to increase the pressure of the compressed gas in the ejector pump.

15. The method for operating a gas turbine as claimed in claim 8, comprising: admixing the compressed gas taken directly from a compressor plenum with the first combustor combustion products in the dilution gas admixer.

16. The method for operating a gas turbine as claimed in claim 8, wherein:
the passing of the compressed gas through the cooling loop of the vane and/or blade of the turbine is driven via a pressure drop of the first combustor.

17. A sequential combustor arrangement for a gas turbine comprising:
a first combustor with a first burner for admitting a first fuel into a first combustion chamber for burning the first fuel to form first combustor combustion products;
a dilution gas admixer positioned to receive the first combustor combustion products from the first combustion chamber;
a second combustion chamber positioned downstream of the dilution gas admixer, with respect to a flow direction of the first combustor combustion products, wherein the first combustor, the dilution gas admixer, and the second combustion chamber are arranged sequentially and are in a fluid flow connection;
a vane and/or blade of a turbine having a cooling loop configured to receive compressed cooling fluid within the vane and/or blade to cool the vane and/or blade, the cooling loop of the vane and/or blade configured to internally cool the vane and/or blade via the compressed cooling fluid without discharging the compressed cooling fluid from the vane and/or blade into hot gas flowing around an exterior of the vane and/or blade;
the cooling loop having an outlet connected to the dilution gas admixer that is positioned and configured to pass the compressed cooling fluid from the vane and/or blade toward the dilution gas admixer so that the compressed cooling fluid that is heated via flowing within the vane and/or blade to cool the vane and/or blade is passable to the dilution gas admixer to be injected into the first combustor combustion products so that the compressed cooling fluid that was heated from passing within the vane and/or blade to cool the vane and/or blade is subsequently admixable with the first combustor combustion products via the dilution gas admixer to facilitate generation of a homogenous temperature profile for the admixed first combustor combustion products and dilution gas to reduce NOx emission values;
the dilution gas admixer positioned and configured to receive the compressed cooling fluid from the outlet of the cooling loop and iniect the dilution gas into the first combustor combustion products such that the compressed cooling fluid that was heated from passing within the vane and/or blade to cool the vane and/or blade is admixed with the first combustor combustion products via, the dilution gas admixer to generate the homogenous temperature profile, for the admixed first combustor combustion products and dilution gas to reduce NOx emission values for feeding the admixed first combustor combustion products and dilution gas to the second burner; and
an additional cooling loop to cool an additional vane and/or blade positioned upstream of the vane and/or blade, with respect to the flow direction of the first combustor combustion products, the additional cooling loop being connected to the compressor plenum to receive the compressed cooling fluid, being open to discharge from the additional vane and/or blade, and being connected to the gas admixer to provide additional compressed heated fluid to the first combustor combustion products.

18. The sequential combustor arrangement of claim 17, wherein the cooling loop has a Venturi nozzle at the oulet to increase a pressure of the compressed cooling fluid leaving the cooling loop.

19. The sequential combustor arrangement of claim 17, comprising:
an ejector pump positioned to increase a pressure of the compressed gas before the compressed gas is fed into the dilution gas admixer.

20. The sequential combustor arrangement of claim 17, wherein the cooling loop is configured so that the compressed gas is passable through the vane and/or blade via a pressure drop of the first combustor so that the compressed cooling fluid that is heated via flowing within the vane and/or blade to cool the vane and/or blade is passable to the dilution gas admixer to be injected into the first combustion products without undergoing recompression.

* * * * *